(12) United States Patent
Wietelmann et al.

(10) Patent No.: US 11,018,334 B2
(45) Date of Patent: May 25, 2021

(54) STABILIZED LITHIUM METAL IMPRESSIONS COATED WITH ALLOY-FORMING ELEMENTS AND METHOD FOR PRODUCTION THEREOF

(71) Applicant: Albemarle Germany GmbH, Frankfurt am Main (DE)

(72) Inventors: Ulrich Wietelmann, Friedrichsdorf (DE); Christoph Hartnig, Eppstein (DE); Ute Emmel, Frankfurt am Main (DE)

(73) Assignee: Albemarle Germany GmbH, Frankfurt am Main (DE)

( * ) Notice: Subject to any disclaimer, the term of this patent is extended or adjusted under 35 U.S.C. 154(b) by 564 days.

(21) Appl. No.: 15/947,147

(22) Filed: Apr. 6, 2018

(65) Prior Publication Data

US 2018/0261834 A1   Sep. 13, 2018

Related U.S. Application Data

(62) Division of application No. 14/371,922, filed as application No. PCT/EP2013/050570 on Jan. 14, 2013, now abandoned.

(30) Foreign Application Priority Data

Jan. 13, 2012 (DE) ...................... 10 2012 200 479.3

(51) Int. Cl.
*H01M 4/36* (2006.01)
*H01M 4/38* (2006.01)
(Continued)

(52) U.S. Cl.
CPC .............. *H01M 4/366* (2013.01); *B05D 1/18* (2013.01); *B22F 1/0062* (2013.01);
(Continued)

(58) Field of Classification Search
CPC .................................................... H01M 4/366
See application file for complete search history.

(56) References Cited

U.S. PATENT DOCUMENTS 5,567,474 A   10/1996   Dover et al.
5,776,369 A   7/1998   Dover et al.
(Continued)

FOREIGN PATENT DOCUMENTS

CN   101295788 A   10/2008
CN   101790806 A   7/2010
(Continued)

OTHER PUBLICATIONS

STIC Search report (Year: 2021).*
(Continued)

*Primary Examiner* — Brian R Ohara
(74) *Attorney, Agent, or Firm* — Marcy M. Hoefling; Troy S. Kleckley; Nathan C. Dunn

(57) ABSTRACT

The invention relates to particulate lithium metal composite materials, stabilized by alloy-forming elements of the third and fourth primary group of the PSE and method for production thereof by reaction of lithium metal with film-forming element precursors of the general formulas (I) or (II): $[AR^1R^2R^3R^4]Li_x$ (I), or $R^1R^2R^3A\text{-}O\text{-}AR^4R^5R^6$ (II), wherein $R^1R^2R^3R^4R^5R^6$=alkyl ($C_1$-$C_{12}$), aryl, alkoxy, aryloxy-, or halogen (F, Cl, Br, I), independently of each other; or two groups R represent together a 1,2-diolate (1,2-ethandiolate, for example), a 1,2- or 1,3-dicarboxylate (oxalate or malonate, for example) or a 2-hydroxycarboxylate dianion (lactate or salicylate, for example); the groups $R^1$ to $R^6$ can comprise additional functional groups, such as alkoxy groups; A=boron, aluminum, gallium, indium, thallium, silicon, germanium, tin, lead; x=0 or 1 for B, Al, Ga, In, Tl; x=0 for Si, Ge, Sn, Pb; in the case that x=0 and A=B, Al, Ga, In, Tl, $R^4$ is omitted, or with polymers comprising (Continued)

Figure 1:
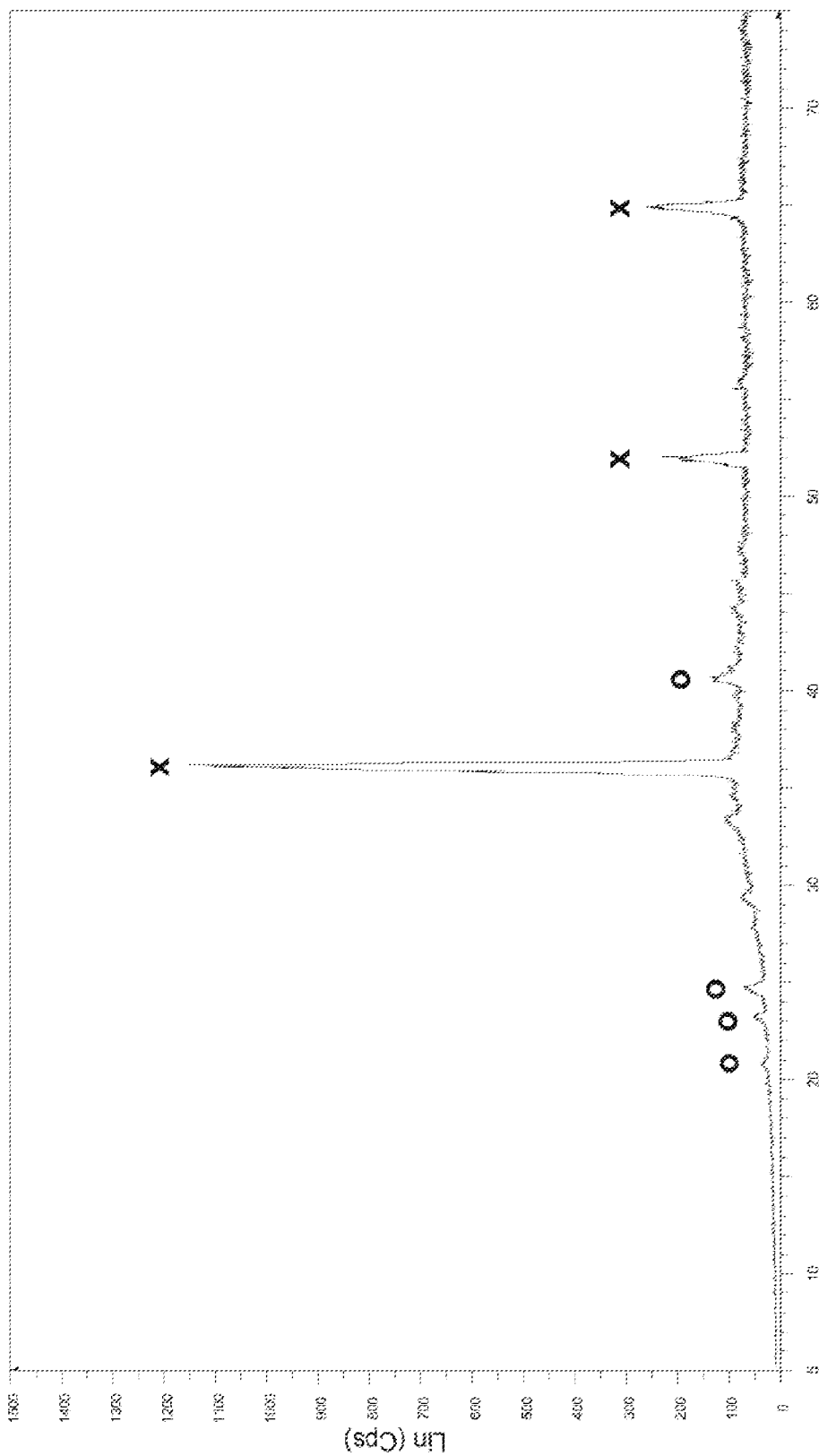

one or more of the elements B, Al, Ga, In, Tl, Si, Ge, Sn, Pb, at temperatures between 50 and 300° C., preferably above the melting temperature of lithium of 180.5° C., in an organic, inert solvent.

14 Claims, 2 Drawing Sheets

(51) Int. Cl.
| | |
|---|---|
| *H01M 4/40* | (2006.01) |
| *H01M 10/052* | (2010.01) |
| *B05B 1/18* | (2006.01) |
| *B22F 1/00* | (2006.01) |
| *B22F 1/02* | (2006.01) |
| *C22C 1/04* | (2006.01) |
| *B05D 1/18* | (2006.01) |

(52) U.S. Cl.
CPC .............. *B22F 1/0088* (2013.01); *B22F 1/02* (2013.01); *C22C 1/0408* (2013.01); *H01M 4/38* (2013.01); *H01M 4/382* (2013.01); *H01M 4/40* (2013.01); *H01M 4/405* (2013.01); *H01M 10/052* (2013.01)

(56) References Cited

U.S. PATENT DOCUMENTS

| | | | |
|---|---|---|---|
| 5,846,673 A | 12/1998 | Saidi et al. | |
| 6,537,701 B1 | 3/2003 | Nimon et al. | |
| 7,588,623 B2 | 9/2009 | Dover et al. | |
| 7,776,385 B2 | 8/2010 | Muldoon et al. | |
| 8,785,045 B2 | 7/2014 | Suzuki | |
| 2002/0182508 A1 | 12/2002 | Nimon et al. | |
| 2004/0005267 A1* | 1/2004 | Boryta | C01F 11/462 |
| | | | 423/421 |
| 2005/0106470 A1* | 5/2005 | Yoon | H01M 10/0569 |
| | | | 429/324 |
| 2007/0006680 A1* | 1/2007 | Dover | B22F 9/06 |
| | | | 75/331 |
| 2007/0082268 A1 | 4/2007 | Star et al. | |
| 2008/0283155 A1 | 11/2008 | Yakovleva et al. | |
| 2009/0035663 A1 | 2/2009 | Yakovleva et al. | |
| 2009/0061321 A1 | 3/2009 | Yakovleva et al. | |
| 2009/0220857 A1 | 9/2009 | Menke et al. | |
| 2010/0024597 A1 | 2/2010 | Dover et al. | |
| 2010/0035141 A1 | 2/2010 | Grosvenor | |
| 2011/0104366 A1 | 5/2011 | Muldoon et al. | |
| 2011/0226987 A1 | 9/2011 | Yakovleva et al. | |
| 2011/0281168 A1 | 11/2011 | Watanabe et al. | |
| 2012/0082900 A1* | 4/2012 | Wietelmann | H01M 10/0567 |
| | | | 429/300 |
| 2014/0050657 A1 | 2/2014 | Takeshima | |
| 2014/0134488 A1 | 5/2014 | Menke et al. | |

FOREIGN PATENT DOCUMENTS

| | | |
|---|---|---|
| JP | 200030703 A | 1/2000 |
| JP | 2008177122 A | 7/2008 |
| JP | 2010538424 A | 12/2010 |
| WO | 0241416 A2 | 5/2002 |
| WO | 2007005983 A2 | 1/2007 |
| WO | 2008045557 A1 | 4/2008 |
| WO | 2010101856 | 9/2010 |

OTHER PUBLICATIONS

Han, Hong-Bo et al.; "Lithium bis(fluorosulfonyl)imide (LiFSI) as Conducting Salt for Nonaqueous Liquid Electrolytes for Lithium-ion Batteries: Physicochemical and Electrochemical Properties"; Journal of Power Sources; 196, (2011); pp. 3623-3632.

Marchioni, Filippo et al.; "Protection of Lithium Metal Surfaces Using Chlorosilanes"; Langmair; 23, (2007); pp. 11597-11602.

Umeda, Grant A. et al.; "Protection of Lithium Metal Surfaces Using Tetraethoxysilane"; Journal of Materials Chemistry; 21, (2011); pp. 1593-1599.

* cited by examiner

STABILIZED LITHIUM METAL IMPRESSIONS COATED WITH ALLOY-FORMING ELEMENTS AND METHOD FOR PRODUCTION THEREOF

CROSS-REFERENCE TO RELATED APPLICATIONS

This application is a divisional of commonly-owned and co-pending U.S. application Ser. No. 14/371,922, filed Jul. 14, 2014, which application a § 371 of International Application No. PCT/EP2015/050570, filed on Jan. 14, 2013, which claims priority from German Patent Application No. 10 2012 200 479.3, filed Jan. 13, 2012. Each patent application identified above is incorporated here by reference in its entirety.

The invention relates to particulate metal composite materials stabilized with alloy-forming elements of main groups 3 and 4 of the periodic table of elements as well as a method for producing the same by reacting lithium metal with film-forming element precursors in an organic inert solvent at temperatures between 50° C. and 300° C., preferably above the melting point of lithium.

Lithium is one of the alkali metals. Like the heavy element homologs of the first main group, lithium is characterized by a strong reactivity with a variety of substances. It thus reacts violently with water, alcohols and other substances containing protic hydrogen, often with ignition. It is unstable in air and reacts with oxygen, nitrogen and carbon dioxide. It is therefore normally handled under an inert gas (noble gases such as argon) and is stored under a protective layer of paraffin oil.

Lithium also reacts with many functionalized solvents, even if they do not contain protic hydrogen. For example, cyclic ethers such as THF are opened by ring cleavage, esters and carbonyl compounds are lithiated and/or reduced in general. The reaction between the aforementioned chemicals and/or environmental substances is often catalyzed by water. Lithium metal can therefore be stored and processed in dry air for long periods of time because it forms a somewhat stable passivation layer that prevents most corrosion. This is also true of functionalized solvents, for example, N-methyl-2-pyrrolidone (NMP), which is much less reactive with lithium in anhydrous form than lithium with a water content of more than a few 100 ppm.

To increase safety in processing and the stability of lithium metal in storage, a number of corrosion-preventing coating methods have been developed. For example, it is known from U.S. Pat. Nos. 5,567,474 and 5,776,369 that molten lithium metal may be treated with $CO_2$. For the coating, molten lithium in an inert hydrocarbon is typically brought in contact with at least 0.3% $CO_2$ for at least one minute. However, the resulting protection is not sufficient for many applications, specifically for prelithiation of battery electrode materials in N-methyl-2-pyrrolidone (NMP) suspension.

Another method for stabilizing lithium metal consists of heating it above its melting point, agitating the molten lithium and bringing it in contact with a fluorination agent, for example, perfluoropentylamine (WO 2007/005983 A2). It is a disadvantage that fluorinating agents are often toxic or caustic and therefore tend to be avoided in industrial practice.

Another method of protective surface treatment of lithium metal consists of coating it with a wax layer, for example, a polyethylene wax (WO 2008/045557 A1). It is a disadvantage that a relatively large amount of coating agent must be applied. This amount is approx. 1% in the examples in the patent application cited above.

US 2008/0283155 A1 describes a method for stabilizing lithium metal, which is characterized by the following steps:
a) Heating lithium metal powder to a temperature above the melting point to produce molten lithium metal,
b) Dispersing the molten lithium metal, and
c) Bringing the molten lithium metal in contact with a substance that contains phosphorus to produce an essentially continuous protective layer of lithium phosphate on the lithium metal powder. It is a disadvantage to handle acidic caustic substances (phosphoric acid) in general and in particular in the presence of lithium metal: these two substances react very violently with one another when brought in contact and release a substantial amount of heat. In addition, the reaction of lithium metal with phosphoric acid produces hydrogen gas, which is explosive.

US 2009/0061321 A1 proposes the production of a stabilized lithium metal powder having an essentially continuous polymer coating. The polymer may be selected from the group of polyurethanes, PTFE, PVC, polystyrene, etc. One disadvantage of this method is that the protected lithium metal has an undefined surface coating of organic substances which can interfere in its subsequent use, for example, for prelithiation of electrode materials.

Finally, an anode for an electrochemical cell containing a metallic material with an oxygen-based coating, is formed with a (additional) protective layer which is formed by reaction of D- or P-block precursors with this layer containing oxygen (WO 2010/101856 A1, US 2007/0082268 A1, US 2009/0220857 A1). The protective layer of the metal anode material is produced by treating a metallic material, which has a coating that contains oxygen, with at least two compounds, wherein the first compound is a large molecular compound and the second compound is a small molecular compound (U.S. Pat. No. 7,776,385 B2, US 2011/0104366 A1). With this type of protective layer formation, surface groups that contain oxygen (for example, hydroxyl functions) will react with D- or P-block precursors, for example, a silicic acid ester, in a nonhydrolytic sol-gel process, forming a film consisting of $SiO_2$ on the anode surface. These chemical reactions can be formulated as follows (G. A. Umeda et al., J. Mater. Chem. 2011, 21, 1593-1599):

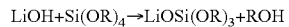

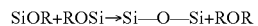

One disadvantage of this method is that it takes place in multiple steps, i.e., first the metallic material, for example, lithium metal, is provided with a layer containing oxygen and then is reacted with two different molecular compounds (D- or P-block precursors).

The object of the invention is to provide lithium metal impressions with a passivating top coat as well as a method for producing these metal impressions,
which do not require the use of gaseous or acidic, caustic or toxic passivating agents,
which cause the formation of a passivating protective layer consisting of a mixed organic/inorganic sparingly soluble film on the lithium surface, and
whose surface coating does not interfere during use as a prelithiating agent for anode materials, for example, and
which contain in the surface layer elements having an affinity for the binders conventionally used.

Such lithium metal impressions should be stable for several days at temperatures up to at least about 50° C. in the presence of polar reactive solvents such as those used for the production of electrode coatings, i.e., NMP, for example.

According to the invention, the object is achieved by the fact that the lithium metal impression contains a core of metallic lithium, which is surrounded with an outer layer containing one or more elements of main groups 3 and/or 4 of the periodic table of elements that can be alloyed with lithium. The lithium metal impressions according to the invention are produced by bringing them in contact with one or more passivating agents of general formulas I or II:

$$[AR^1R^2R^3R^4]Li_x \qquad (I)$$

$$\text{or } R^1R^2R^3A\text{-O-}AR^4R^5R^6 \qquad (II)$$

wherein
  $R^1R^2R^3R^4R^5R^6$=independently of one another alkyl ($C_1$-$C_{12}$), aryl, alkoxy, aryloxy or halogen (F, Cl, Br, I) or two radicals R together denote a 1,2-diolate (for example, 1,2-ethanediolate), a 1,2- or 1,3-dicarboxylate (for example, oxalate or malonate) or a 2-hydroxycarboxylate dianion (for example, glycolate, lactate or salicylate);
  radicals $R^1$ to $R^6$ may contain additional functional groups, for example, alkoxy groups;
  A=boron, aluminum, gallium, indium, thallium, silicon, germanium, tin, lead;
  x=0 or 1 for B, Al, Ga, In, Tl;
  x=0 for Si, Ge, Sn, Pb;
  in the case when x=0 and A=B, Al, Ga, In, Tl, then $R^4$ is omitted,
or bringing them in contact with polymers containing one or more of the elements B, Al, Ga, In, Tl, Si, Ge, Sn, Pb.

In contact with lithium, compounds with halogen bonds can be cleaved, forming lithium halide in part. The lithium halide may be deposited in the coating layer because it is not soluble in the inert hydrocarbon-based solvent that is used, i.e., forming a lithium that may also contain lithium halide in its surface. When using such a powder in a lithium battery, which usually contains liquid electrolytes, which in turn contain polar organic solvents, the lithium halide dissolves and may then come in contact with all battery components. It is known that lithium halides, in particular LiCl, LiBr and LiI, have a corrosive effect on cathode current diverters made of aluminum. This attack shortens the calendar lifetime of the battery (see, for example, H. B. Han, J. Power Sources 196 (2011), 3623-32). In the case of housings or current diverters made of aluminum, the use of lithium impressions treated with halogen-free passivating agents is preferred.

The preferred lithium source is a pure grade, i.e., in particular a grade of lithium that has a very low sodium content. Such metal grades are available commercially as "battery grade" lithium. The Na content is preferably <200 ppm and especially preferably <100 ppm. It has surprisingly been found that when using lithium metal of a low sodium content, particularly stable products that can be handled safely can be produced.

The reaction between the lithium metal and one or more of the passivating agents according to the invention takes place in the temperature range between 50 and 300° C., preferably between 100 and 280° C. Molten lithium is most especially preferably used, i.e., the reaction temperature is at least 180.5° C. and spherical lithium particles (i.e., lithium powder or granules consisting of spherical particles) are produced and treated in the molten form with a passivating agent according to the invention.

In a most especially preferred production variant, the lithium is first heated to a temperature above the melting point of lithium (180.5° C.) under an inert gas (noble gas, for example, dry argon) in an organic inert solvent or solvent mixture (usually hydrocarbon based). This process can take place at normal pressure when using solvents with boiling points >180° C. (for example, undecane, dodecane or corresponding commercially available mineral oil mixtures, for example, Shellsols). On the other hand, if more readily volatile hydrocarbons, for example, hexane, heptane, octane, decane, toluene, ethylbenzene or cumene are used, then the melting process takes place in a closed vessel under pressurized conditions.

After complete melting, an emulsion of the metal in hydrocarbon is prepared. Depending on the desired particle geometries (diameter), this is accomplished by homogenization using agitating tools which yield the required shearing forces for the respective impression. For example, if a powder with particle sizes of less than 1 mm is to be prepared, a dispersing disk may be used, for example. The precise dispersing parameters (i.e., mainly the rotational speed and dispersing time) will depend on the desired particle size. These parameters also depend on the viscosity of the dispersing solvent as well as individual geometric parameters of the agitating element (e.g., diameter, exact position and size of the teeth). Those skilled in the art can easily determine how to fine tune, through appropriate experiments, the dispersing process for preparing the desired particle distribution.

If lithium particles in a grain size range between 5 and 100 µm are to be produced, then the agitating frequency is generally between 1000 and 25,000 revolutions per minute (rpm), preferably 2000 to 20,000 rpm. The dispersing time, i.e., the period of time within which the dispersing tool runs at full capacity is between 1 and 60 minutes, preferably 2 and 30 minutes. If particularly finely divided particles are desired, then extremely high-speed special tools may be used, for example, it is available commercially under the brand name Ultraturrax.

The passivating agent may be added together with the metal and the solvent before the start of the heating phase. However, the passivating agent is preferably added only after melting the metal, i.e., at temperatures >180.5° C. This addition may take place in an uncontrolled manner (i.e., in one portion) during the dispersion process, but the passivating agent is preferably added over a period of time over approx. 5 to 5000 sec, especially preferably 30 sec to 1000 sec.

Alternatively, the particle preparation can also be accomplished by an atomization process. In this case, molten lithium is sprayed into an inert gas atmosphere. After the resulting metal powder has cooled and solidified, it can be dispersed in an inert organic solvent (usually a hydrocarbon) and reacted with one or more of the passivating agents according to the invention at temperatures below the melting point of lithium.

Suitable passivating agents include the molecular or "at" compounds of the general formulas I or II or polymers containing elements of main groups 3 and/or 4 of the periodic table of elements that can be alloyed with lithium. Especially preferred compound are those of boron, aluminum, silicon and tin. Examples of particularly preferred passivating agents include:
  Boric acid esters of the general formula $B(OR)_3$,
  Boron and aluminum halides $B(Hal)_3$ and/or $Al(Hal)_3$,
  Lithium borates and aluminates of the formulas $Li[B(OR)_4]$ and/or $Li[Al(OR)_4]$, Aluminum alcoholates of the general formula $Al(OR)_3$,
Alkyl aluminum compounds of the general formula $AlR_{3-n}Hal_n$ (n=0, 1 or 2),
Silicon and tin halides $Si(Hal)_4$ and $Sn(Hal)_4$,
Silicic acid esters $Si(OR)_4$ and tin alcoholates $Sn(OR)_4$,
Disiloxanes and distannoxanes $R_3Si$—O—$SiR_3$ and $R_3Sn$—O—$SnR_3$,
Alkyl compounds of silicon and tin, $SiR_4$, $SnR_4$,
Mixed alkyl halogen compounds of silicon and tin $SiR_{4-n}Hal_n$ (n=1, 2 or 3) and/or $SnR_{4-n}Hal_n$ (n=1, 2 or 3),
Mixed alkylalkoxy compounds of silicon and tin $SiR_{4-n}(OR)_n$ (n=1, 2 or 3) and/or $SnR_{4-n}(OR)_n$ (n=1, 2 or 3),
Silicon-based polymers such as silicones (polyorganosiloxanes such as $R_3SiO[R_2SiO]_nSi\,R_3$, e.g., poly(dimethylsiloxane)

where Hal=F, Cl, Br, I; R=alkyl, alkenyl or aryl radicals or two radicals R together denote a 1,2-diolate (e.g., 1,2-ethanediolate), a 1,2- or 1,3-dicarboxylate (e.g., oxalate or malonate) or a 2-hydroxycarboxylate dianion (e.g., salicylate, glycolate or lactate).

The passivating agents, either in pure form or dissolved in a solvent that is inert with respect to lithium metal (i.e., hydrocarbons, for example) or in a less reactive aprotic solvent (an ether, for example), are added to the mixture of lithium metal and the aprotic inert solvent. Addition of the passivating agent is followed by a post-reaction phase, during which the reaction is completed. The duration of the post-reaction phase depends on the reaction temperature and the reactivity of the selected passivating agent with respect to lithium metal. The average particle size of the metal powder according to the invention is max. 5000 μm, preferably max. 1000 μm and especially preferably max. 300 μm.

However, the method according to the invention is also suitable for passivation of nonspherical lithium metal impressions, for example, lithium foil. In this case, the passivation is performed with the film-forming precursors of main groups 3 and/or 4 of the periodic table of elements at temperatures below the melting point of lithium.

In the sense of the present invention, it is also possible to perform a multistep passivation, in which at least once one or more of the passivating agents according to the invention are used. For example, passivation may first be performed according to the prior art using fatty acids or fatty acid esters and the resulting particulate lithium metal can then be stabilized further by an additional coating with one of the passivating agents according to the invention. This additional passivation is performed in a hydrocarbon solvent, preferably at temperature below the melting point of lithium (i.e., <180.5° C.).

The amount of passivating agent used for the surface coating depends on the particle size, the chemical structure of the passivating agent and the desired layer thickness. In general the molar ratio between Li metal and the passivating agent is 100:0.01 to 100:5, preferably 100:0.05 to 100:1. In the case of polymeric passivating agents, the molar ratio is calculated from the quotient of lithium and a single monomer unit. For example, in the case of poly(dimethyl)siloxane (monomer unit=$(CH_3)_2SiO$) an effective molecular weight is 74 g/mol.

When using the preferred amount of passivating agent, lithium metal products having contents >95% preferably >97% are the result.

The passivated lithium metal impression according to the invention surprisingly contains the alloy-forming element A at least partially in elemental form or in the form of an alloy with lithium. Silicon is thus formed in the reaction of the passivating agents containing silicon according to the invention with metallic lithium, forming in a second step the Li-rich alloy $Li_{21}Si_5$. It is assumed that metallic lithium is formed by a redox process by using silicic acid esters as follows, for example:

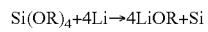

$$Si(OR)_4 + 4Li \rightarrow 4LiOR + Si$$

In a second step the resulting metallic silicon forms one of the known crystalline Li alloys (mostly one of the existing alloys having the highest lithium content, i.e., $Li_{21}Si_5$) in the case of Si. The lithium alcoholate which is formed as a coupling product may react further depending on the selected synthesis conditions, forming lithium oxide, for example. A multicomponent coating of the lithium impression consisting of an alloy layer and a salt-type layer containing Li is formed in this way.

Lithium metal powder that has a low sodium content and has been passivated according to the invention has surprisingly been proven to be particularly stable in contact with reactive polar solvents, for example, N-methyl-2-pyrrolidone.

The lithium metal powder according to the invention surprisingly does not have any significant exothermic effect in the DSC test in suspension with N-methyl-2-pyrrolidone (water content less than approx. 200 ppm) when stored for at least 15 hours at 50° C. and especially preferably at 80° C. and in particular it does not exhibit any "runaway" phenomenon. This behavior will now be explained on the basis of the following examples.

The passivated lithium metal impressions according to the invention may be used for prelithiation of electrochemically active materials, e.g., graphite, alloy or conversion anodes for lithium batteries or after a suitable mechanical physicochemical pretreatment (pressing, mixing with binder materials, etc.) for the production of metal anodes for lithium batteries.

The present invention will now be explained in greater detail below on the basis of five examples and two illustrations without thereby limiting the claimed scope of the embodiments.

The product stability is determined by means of DSC (differential scanning calorimetry). An apparatus from the Systag company in Switzerland (the Radex system) was used. Approx. 2 g NMP and 0.1 g lithium metal powder were weighed into the sample containers. Samples were stored for 15 hours at certain temperatures. The particle size distribution was determined using the Lasentec FBRM inline analyzer from Mettler-Toledo.

Figure 2:
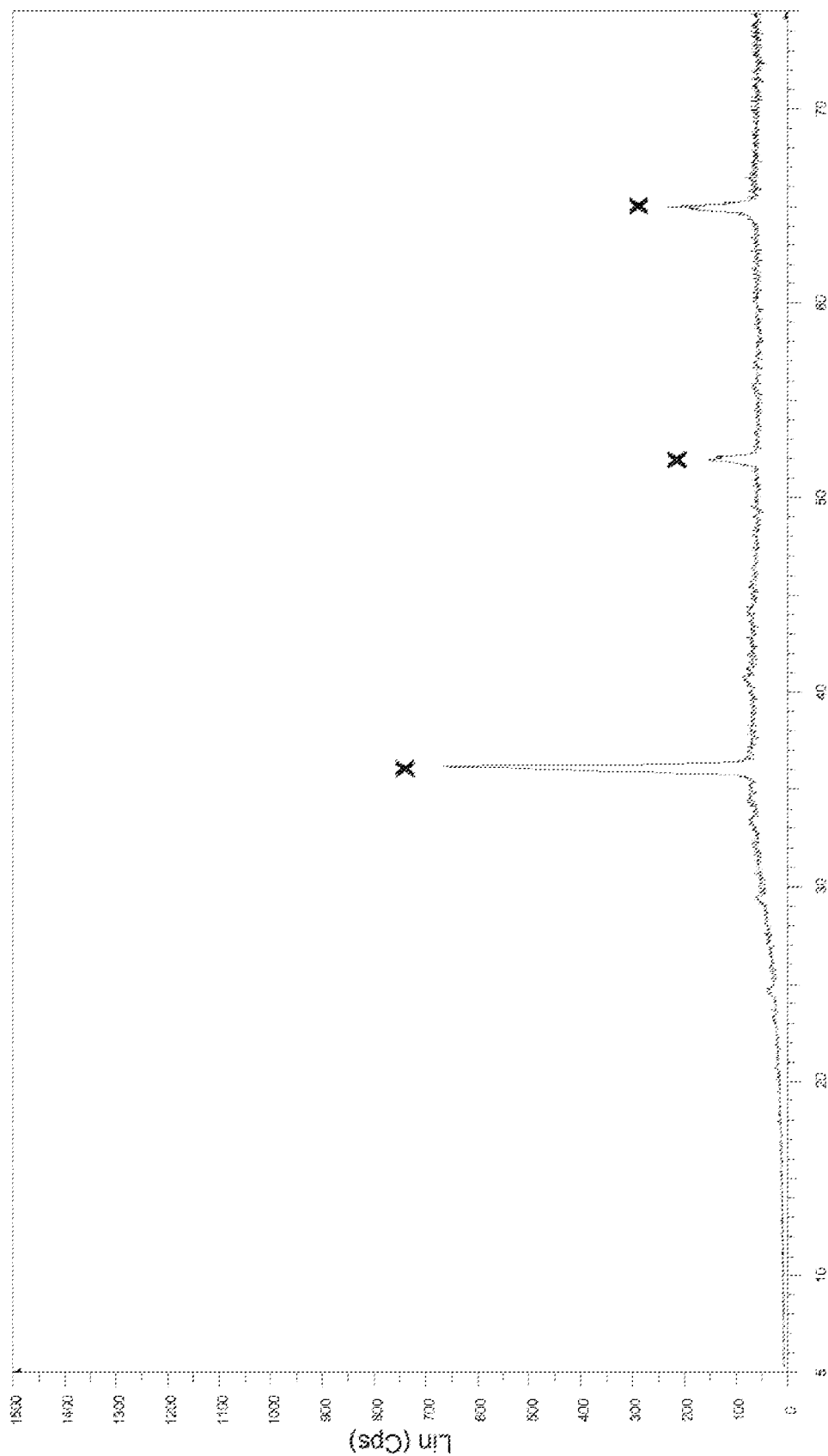

FIG. 1 shows an x-ray diffractogram of the metal powder from example 1, passivated with a layer containing Si
x: reflexes of lithium metal
o: reflexes of $Li_{21}Si_5$
FIG. 2 shows an x-ray diffractogram of the metal powder from Example 2 passivated with a layer containing Si

EXAMPLE 1

Production of a Lithium Metal Powder Having a Low Sodium Content, Passivated with a Layer Containing Silicon (Tetraethyl Silicate, TEOS, as the Passivating Agent 405 g Shellsol® D100 and 20.1 g lithium metal sections are placed in a dry 2-liter stainless steel double-jacketed reactor equipped with a dispersing agitator mechanism and inertized with argon. The lithium has a sodium content of 40 ppm. While agitating gently (approx. 50 rpm), the internal temperature is raised to 240° C. by jacket heating and a metal emulsion is produced by means of the disperser. Then 1.5 g TEOS dissolved in 10 mL Shellsol® D100 is added with a syringe within about 5 minutes. During this addition, the suspension is agitated with a strong shearing action. Then the agitator is stopped and the suspension is cooled to room temperature.

The suspension is poured onto a glass suction filter. The filter residue is washed several times with hexane until free of oil and then vacuum dried.

Yield: 19.2 g (95% of the theoretical);
Average particle size: 140 μm (FBRM particle size analyzer from Mettler-Toledo);
Metal content: 99.5% (gas volumetric);
Stability in NMP, water content 167 ppm: stable for 15 hours at 80° C.; runaway reaction after 2.5 hours at 90° C.;
Si content: 0.40 wt %;
Surface analysis by XRD: phase components of $Li_{21}Si_5$

EXAMPLE 2

Production of a Lithium Metal Powder with a Low Sodium Content, Passivated with a Layer Containing Silicon (Vinyl Triethoxysilane as the Passivating Agent 415 g Shellsol® D100 and 98.4 g lithium metal sections are placed in a dry 2-liter stainless steel double-jacketed reactor equipped with a dispersing agitator mechanism and inertized with argon. The lithium has a sodium content of 40 ppm. While agitating gently (approx. 50 rpm), the internal temperature is raised to 240° C. by jacket heating and a metal emulsion is prepared by means of the disperser. Then 2.7 g vinyl triethoxysilane dissolved in 20 mL Shellsol® D100 is added with a syringe within about 5 minutes. During this addition, the suspension is agitated with a strong shearing action. Then the agitator is stopped and the suspension is cooled to room temperature.

The suspension is poured onto a glass suction filter. The filter residue is washed several times with hexane until free of oil and then vacuum dried.

Yield: 95.2 g (97% of the theoretical);
Average particle size: 101 μm (FBRM particle size analyzer from Mettler-Toledo);
Metal content: 99.7% (gas volumetric);
Stability in NMP, water content 167 ppm: stable for 15 hours at 80° C.; a slightly exothermic reaction (no runaway phenomenon) after 2 hours at 90° C.;
Si content: 0.26 wt %;
Surface analysis by XRD: very little phase amounts of $Li_{21}Si_5$

EXAMPLE 3

Production of a Lithium Metal Powder with a Low Sodium Content, Passivated with a Layer Containing Silicon (Polydimethylsiloxane, PDMS as the Passivating Agent 405 g Shellsol® D100 and 20.6 g lithium metal sections are placed in a dry 2 liter stainless steel double-jacketed reactor equipped with a dispersing agitator mechanism and inertized with argon. The lithium has a sodium content of 40 ppm. While agitating gently (approx. 50 rpm), the internal temperature is raised to 240° C. by jacket heating and a metal emulsion is prepared by means of the disperser. Then 3.3 g polydimethylsiloxane (CAS no. 9016-00-6) is added with a syringe within about 3 minutes. During this addition, agitating is continued with a strong shearing action. Agitation is then continued for 30 minutes at about 210° C., the agitator is then stopped and the suspension is cooled to room temperature.

The suspension is poured onto a glass suction filter. The filter residue is washed several times with hexane until free of oil and then vacuum dried.

Yield: 20.1 g (98% of the theoretical);
Average particle size: 51 μm (FBRM particle size analyzer from Mettler-Toledo);
Metal content: 99% (gas volumetric);
Stability in NMP, water content 167 ppm: stable for 15 hours at 80° C., then runaway after a few minutes at 100° C.;
Si content: 0.70 wt %;

EXAMPLE 4

Production of a Lithium Metal Powder with a Low Sodium Content, Passivated with a Layer Containing Boron (Lithium Bis(Oxalate)Borate, LiBOB) as the Passivating Agent 396 g Shellsol® D100 and 19.1 g lithium metal sections are placed in a dry 2 liter stainless steel double-jacketed reactor equipped with a dispersing agitator mechanism and inertized with argon. The lithium has a sodium content of 40 ppm. While agitating gently (approx. 50 rpm), the internal temperature is raised to 210° C. by jacket heating and a metal emulsion is pre pared by means of a disperser. Then 6.1 g of a 30% solution of LiBOB in THF is added with a syringe within about 4 minutes. During this addition, the suspension is agitated with a strong shearing action. Next the agitator is stopped and the suspension is cooled to room temperature.

The suspension is poured onto a glass suction filter. The filter residue is washed several times with hexane until free of oil and then vacuum dried.

Yield: 20.5 g (107% of the theoretical);
Average particle size: 43 μm (FBRM particle size analyzer from Mettler-Toledo);
Metal content: 96% (gas volumetric);
Stability in NMP, water content 167 ppm: stable for 15 hours at 80° C.; runaway after 4 hours at 100° C.;

EXAMPLE 5

Production of a Lithium Metal Powder with a Low Sodium Content, Passivated by a Layer Containing Boron (Triisopropyl Borate as the Passivating Agent 435 g Shellsol® D100 and 19.6 g lithium metal sections are placed in a dry 2 liter stainless steel double-jacketed reactor equipped with a dispersing agitator mechanism and inertized with argon. The lithium has a sodium content of 17 ppm. While agitating gently (approx. 50 rpm), the internal temperature is raised to 210° C. by jacket heating and a metal emulsion is pre pared by means of the disperser. Then 2.7 g triisopropyl borate dissolved in 20 mL Shellsol® D100 is added with a syringe within about 10 minutes. During this addition, the emulsion is agitated with a strong shearing action. Next the agitator is stopped and the suspension is cooled to room temperature.

The suspension is poured onto a glass suction filter. The filter residue is washed several times with hexane until free of oil and then vacuum dried.

Yield: 19.4 g (99% of the theoretical);
Average particle size: 125 μm (FBRM particle size analyzer from Mettler-Toledo);
Metal content: 97% (gas volumetric);
Stability in NMP, water content 167 ppm: stable for 15 hours at 80° C.; stable for 15 hours at 100° C.; runaway after a few minutes at 120° C.;
B content: 0.68 wt %;

What is claimed is:

1. A method for producing a stabilized particulate lithium metal, the method comprising:
bringing lithium metal into contact with one or more passivating agents in a range of 180.5° C. to 300° C. in an inert organic solvent; wherein the one or more passivating agents is/are of formula I or formula II, where:

$$[AR^1R^2R^3R^4]Li_x \quad (I)$$

$$R^1R^2R^3A\text{-}O\text{-}AR^4R^5R^6 \quad (II)$$

wherein
each of $R^1$, $R^2$, $R^3$, $R^4$, $R^5$, and $R^6$ is independently of one another alkyl ($C_1$-$C_{12}$), aryl, alkoxy, aryloxy or halogen or two radicals R together denote a 1,2-diolate, a 1,2- or 1,3-dicarboxylate or a 2-hydroxycarboxylate dianion;
radicals $R^1$ to $R^6$ may contain additional functional groups,
A is selected from the group consisting of boron, aluminum, gallium, indium, thallium, silicon, germanium, tin and lead;
x is 0 or 1 when A is boron, aluminum, gallium, indium, thallium; and
x is 0 when A is silicon, germanium, tin or lead;
wherein when x is 0 and A is boron, aluminum, gallium, indium or thallium, then $R^4$ is omitted, and
wherein the lithium metal has a content of sodium of less than 200 ppm.

2. The method according to claim 1, wherein two radicals R together denote 1,2-ethanediolate, oxalate, malonate, salicylate, glycolate or lactate.

3. The method according to claim 1, wherein the molar ratio between the lithium metal and the one or more passivating agents is 100:0.01 to 100:5.

4. The method according to claim 1, wherein the molar ratio between the lithium metal and the one or more passivating agents is 100:0.05 to 100:1.

5. The method according to claim 1, wherein inert organic solvent is selected from the group consisting of hexane, heptane, octane, decane, undecane, dodecane, toluene, ethylbenzene and cumene.

6. The method according to claim 1, wherein an additional coating step is performed by bringing the stabilized particulate lithium metal into contact with the one or more passivating agents at temperature of less than 180.5° C.

7. The method according to claim 1, wherein the stabilized particulate lithium metal has a core of metallic lithium which is surrounded with an outer passivating layer containing one or more elements of main groups 3 and/or 4 of the periodic table of elements that can be alloyed with lithium and wherein one or more elements of main groups 3 and/or 4 is/are present in the outer passivating layer in elemental form or as an alloy with lithium and the stabilized particulate lithium metal has an average particle size of max. 5000 μm.

8. The method according to claim 7, wherein the stabilized particulate lithium metal has an average particle size of max. 1000 μm.

9. The method according to claim 7, wherein the stabilized particulate lithium metal has an average particle size of max. 300 μm.

10. The method according to claim 7, wherein the lithium metal is spherical lithium metal selected from lithium powder or granules of ball shaped particles.

11. The method according to claim 1, wherein the lithium metal has a content of sodium in an amount of less than 200 ppm.

12. The method according to claim 1, wherein the lithium metal has a content of sodium in an amount of less than 100 ppm.

13. The method according to claim 1, wherein the lithium metal has a content of sodium in an amount of less than 50 ppm.

14. The method according to claim 1, wherein the one or more passivating agents are not gaseous, acidic, caustic, or toxic passivating agents.

* * * * *